(12) United States Patent
Johnson (10) Patent No.: US 7,753,101 B2
(45) Date of Patent: Jul. 13, 2010

(54) MOUNTING STRIP FOR SCREENS

(76) Inventor: Gordon Johnson, 130 Curry Point, Dadesville, AL (US) 36853

(*) Notice: Subject to any disclaimer, the term of this patent is extended or adjusted under 35 U.S.C. 154(b) by 712 days.

(21) Appl. No.: 10/894,203

(22) Filed: Jul. 19, 2004

(65) Prior Publication Data

US 2005/0236120 A1 Oct. 27, 2005

Related U.S. Application Data

(60) Provisional application No. 60/565,809, filed on Apr. 27, 2004.

(51) Int. Cl.
*A47H 3/00* (2006.01)

(52) U.S. Cl. .................... 160/368.1; 160/404; 24/442; 24/452

(58) Field of Classification Search .................. 52/633, 52/663, 670, 676, DIG. 13; 160/368.1, 382, 160/384, 327, 354, 404, 398, 399, 402, 403; 24/716, 452, 449, 451, 442, 444, 446, 450
See application file for complete search history.

(56) References Cited

U.S. PATENT DOCUMENTS

| | | | | |
|---|---|---|---|---|
| 3,261,069 A | * | 7/1966 | Mathison | 24/450 |
| 4,169,303 A | * | 10/1979 | Lemelson | 24/452 |
| 4,249,589 A | * | 2/1981 | Loeb | 160/368.1 |
| 4,330,022 A | * | 5/1982 | Bull et al. | 160/379 |
| 4,867,222 A | * | 9/1989 | Roman et al. | 160/89 |
| 4,899,797 A | | 2/1990 | Green | |
| 4,972,896 A | * | 11/1990 | Roberts | 160/354 |
| 4,993,471 A | * | 2/1991 | Golden | 160/370.21 |
| 5,423,589 A | * | 6/1995 | Pank | 296/146.15 |
| 5,678,286 A | * | 10/1997 | Murasaki | 24/444 |
| 5,781,969 A | * | 7/1998 | Akeno et al. | 24/452 |
| 5,887,320 A | * | 3/1999 | Provost | 24/452 |
| 6,061,881 A | * | 5/2000 | Takizawa et al. | 24/446 |
| 6,112,377 A | * | 9/2000 | Wilson | 24/452 |
| 6,179,037 B1 | * | 1/2001 | Tees | 160/368.1 |
| 6,250,040 B1 | | 6/2001 | Green | |
| 6,254,304 B1 | * | 7/2001 | Takizawa et al. | 403/363 |
| 6,645,226 B1 | * | 11/2003 | Jacobs et al. | 606/215 |
| 6,851,161 B2 | * | 2/2005 | Kingsford et al. | 24/306 |
| 2004/0076793 A1 | * | 4/2004 | Clune et al. | 428/100 |
| 2007/0022580 A1 | * | 2/2007 | Ducauchuis | 24/452 |

* cited by examiner

*Primary Examiner*—David Purol
(74) *Attorney, Agent, or Firm*—Gardner Groff Greenwald & Villanueva, PC (57) ABSTRACT

An elongate mounting strip for mounting screens to structures includes an elongate base that can be secured to the structure with screws, bolts, rivets, adhesives, etc. The elongate base includes an array of relatively stiff filaments or hooks or posts over which the edge of the screen can be stretched and secured. The filaments or hooks engage through and hook onto the openings in the screen to secure the screen in place. A protective and decorative cover is provided for concealing this attachment.

10 Claims, 7 Drawing Sheets

MOUNTING STRIP FOR SCREENS

CROSS-REFERENCE TO RELATED APPLICATIONS

The present application claims the priority benefit of U.S. provisional patent application Ser. No. 60/565,809, filed Apr. 27, 2004 and incorporates the disclosure of the same herein by reference.

FIELD OF THE INVENTION

The present invention relates generally to mesh screen, and more particularly to mounting strips used in the installation of mesh screens intended for use in the construction of screened-in areas, windows and door frames and the like.

BACKGROUND OF THE INVENTION

In many situations, it is desirable to enclose a space with wire (typically aluminum) screen or fiberglass screen to keep out insects, while still enjoying the outdoors. Such screens are often used to enclose entire rooms, like in a screened-in porch or around a home swimming pool. Screens are also used in screen doors and window openings. Indeed, screens are used in a wide variety of circumstances. However, current methods of installing screen lack good strength and can be difficult for a user to employ. For mounting screens, it has long been known to provide an aluminum extrusion having an elongate channel running lengthwise in the extrusion for receiving an edge of the screen therein. The screen is held in place in the channel by a resilient spline that is forced into the channel. One disadvantage of this arrangement is that the screen needs to be stretched tightly over the extrusion while installing the spline. This can be difficult to do.

U.S. Pat. No. 4,899,797 shows another mounting arrangement in the form of a screen retainer strip assembly that has a base strip adapted to be fastened to a wooden frame member, with the base strip having two grooves extending axially. Each of the grooves is adapted for holding one spline, with a portion of the screen wound about the spline. The base strip is adapted to be secured to the wooden frame member by screws and has catches which hook onto corresponding parts of a protective, decorative cap for concealing the fastening of the screen to the base. Unfortunately, the screen retainer strip assembly according to the patent has limited holding strength such that high winds can separate the screen from the retainer strip assembly.

Accordingly, it can be seen that a need yet remains in the art for a mounting strip for screens, which mounting strip has improved strength and yet which is easy to install and use. It is to the provision of such a mounting strip that the present invention is primarily directed.

SUMMARY OF THE INVENTION

Briefly described, in a preferred form the present invention comprises an elongate mounting strip for mounting screens to structures. The mounting strip includes an elongate base that can be secured to the structure with screws, bolts, rivets, adhesives, etc. The elongate base includes an array of relatively stiff filaments or hooks over which the edge of the screen can be stretched and secured. The filaments or hooks engage through and hook onto the openings in the screen to secure the screen in place. A protective and decorative cover can be provided for concealing this attachment.

In one aspect, the present invention is a mounting strip for mounting an open mesh screen to a structure. The mounting strip comprises an elongate base and an elongate array of relatively stiff posts over which the screen can be stretched, with the posts engaging through openings in the screen to secure the screen in place.

Optionally, the mounting strip can have openings formed therein for receiving fasteners therethrough for securing the base to the structure.

Optionally, the mounting strip base can be secured to the structure with adhesive. Optionally, the mounting strip can comprise a protective cover for engaging and concealing the base. The mounting strip base can be adapted to secure a screen thereto without the use of a resilient spline.

Optionally, the mounting strip posts can be angled at an acute angle with respect to the base to help hold the screen in place.

Preferably, the mounting strip posts can comprise hooks. The mounting strip posts can be similar to the hooks of hook and loop fastener material. In one form, the mounting strip has an elongate base having two parallel rows of posts, with the posts being angled somewhat toward each other.

Preferably, the mounting strip elongate base and posts are molded from plastic. The mounting strip can include a protective cover with openings corresponding to the location and spacing of the posts. Also, the mounting strip protective cover can have loop material for engaging the posts for securing the cover to the base.

Optionally, the mounting strip elongate has an alignment element and the protective cover has a corresponding alignment element for engaging the alignment element of the base.

In another aspect, the invention is a mounting strip for mounting an open mesh screen to a structure, wherein the mounting strip comprises an elongated base and a means for securing the mesh screen to said base without the use of a resilient spline.

Advantageously, these constructions allow the screen to be pulled tight over the mounting strip and then securely mounted thereto by simply engaging the screen with the posts or filaments or hooks of the mounting strip. This simplifies and speeds the task of mounting a screen.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 7 is a perspective view of the mounting strip of FIG. 1, shown with two mesh screens attached there to.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification, including in the appended claims, the singular forms "a", "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
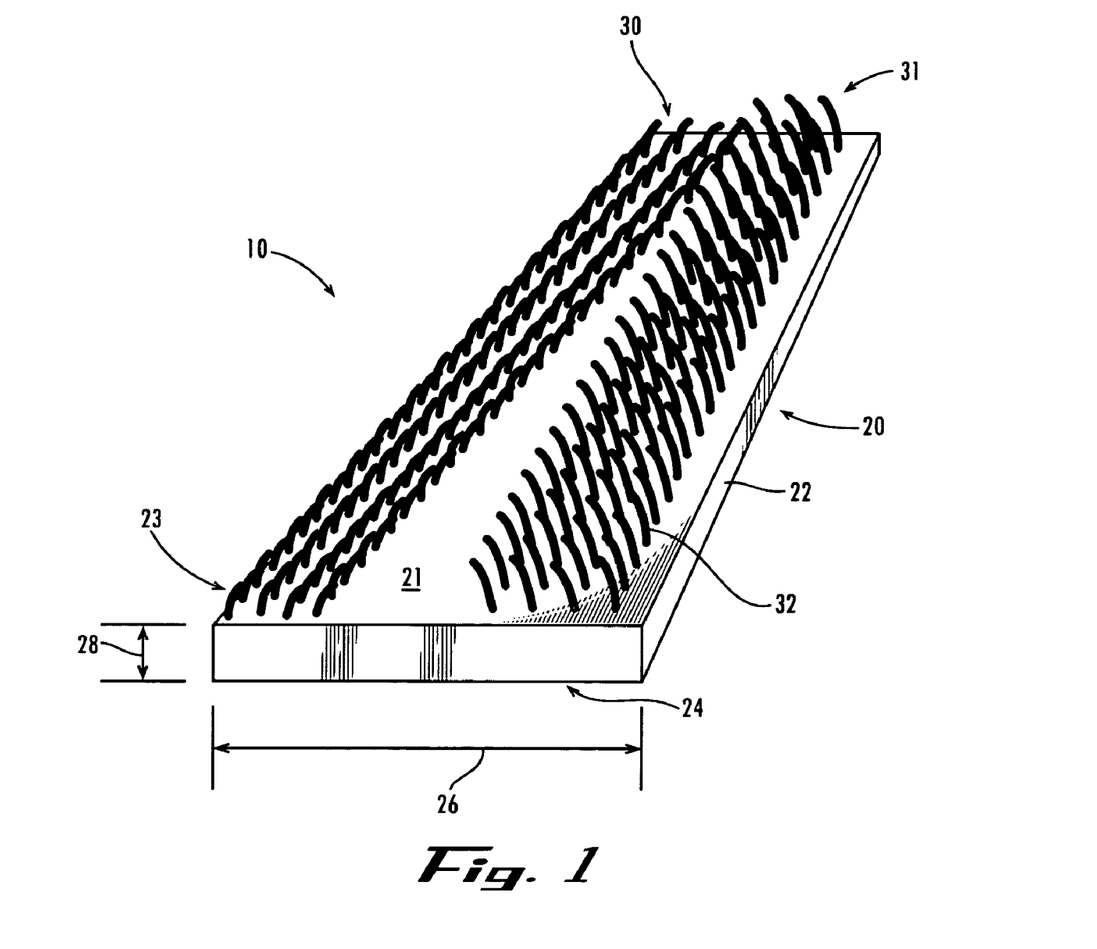
FIG. 1 is a perspective view of a mounting strip according to a first preferred form of the invention.

With reference now to the drawing figures, FIG. 1 generally depicts a mounting strip 10 according to a first preferred embodiment of the present invention, which mounting strip 10 comprises a rigid elongate base 20 and two arrays 30, 31 of relatively stiff posts 32. The posts 32 can also be considered as filaments or projections. The elongate base 20 includes front and rear faces 22, 23, along with top and bottom faces 21, 24. The elongate base 20 can take on a variety of shapes, however, it is preferred that the base be rectangular in section, having a width 26 much larger than its height 28. Preferably, the base 20 is elongate, with a length which is similar to the length of the working surface to which the mounting strip 10 will be affixed. In one preferred form, the rigid posts 32 protrude from the top of the base 20 and consist of hooks similar to those found in hook and fastener material. As seen in FIG. 1, the mounting strip 10 can have two arrays of posts 32; however, those skilled in the art will recognize that the mounting strip may have one or more arrays.

Preferably, the posts 32 are relatively short and stiff. The posts preferably are stiff and strong enough to resist substantial forces resulting from tension in the screen mesh. Such forces include bending forces and shear forces. The length of the posts preferably is chosen to be somewhat on the same order of magnitude as the diameter (or other major dimension) of the posts. This results in a rather "stubby" post. This stubbiness contributes somewhat to the practical strength of the posts. For example, the inventor has found that for typical installations of fiberglass or aluminum mesh screen, a plastic post having a length of ⅛th inch results in a post of readily sufficient strength to securely attach the mesh screen to the mounting strip. Of course, those skilled in the art will recognize that for high-strength applications, such as in using stainless steel mesh in prison environments, it might be necessary to provide larger posts or use material having higher overall strength.

In preferred embodiments, the mounting strip 10 can be secured to a working surface through the use of various fasteners, including nails, screws, and staples. Optionally, the mounting strip 10 can be secured with adhesive. The mounting strip 10, including the base 20 and the posts 32, can be made out of rigid plastic chosen for suitable strength and durability. Of course, those skilled in the art will recognize that the material properties of the mounting strip 10 can vary. Additionally, the mounting strip could be made entirely or partially of metals or rubber, or other materials.

Figure 2A:
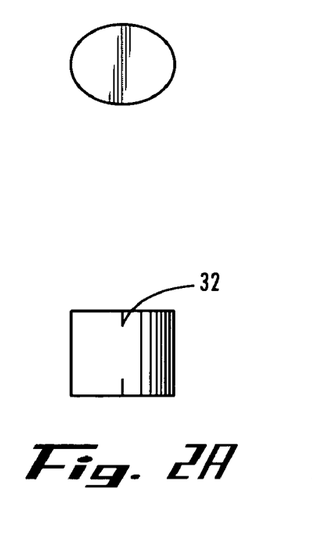
FIGS. 2A-2L are perspective views of mounting strip post portions of the invention of FIG. 1, shown in alternate forms.
Figure 2B:
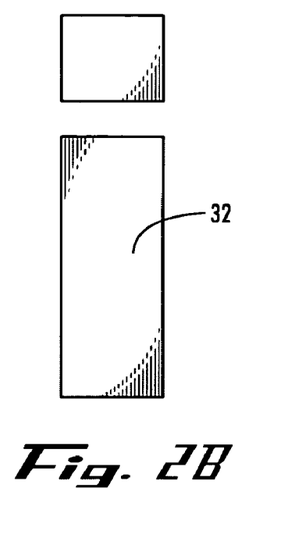
Figure 2C:
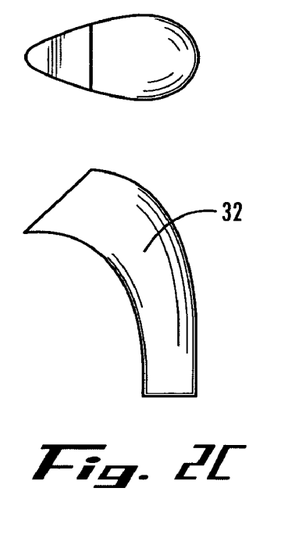
Figure 2D:
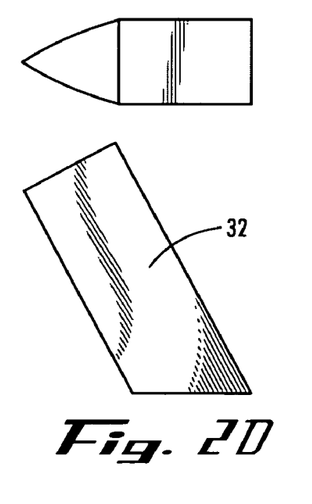
Figure 2E:
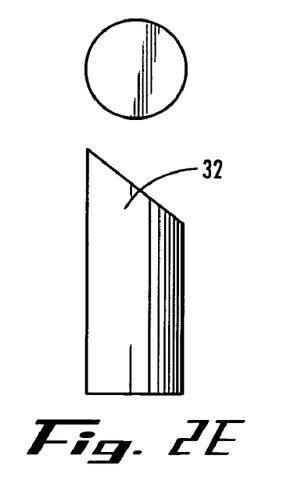
Figure 2F:
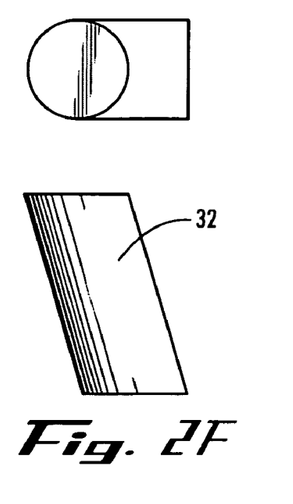
Figure 2G:
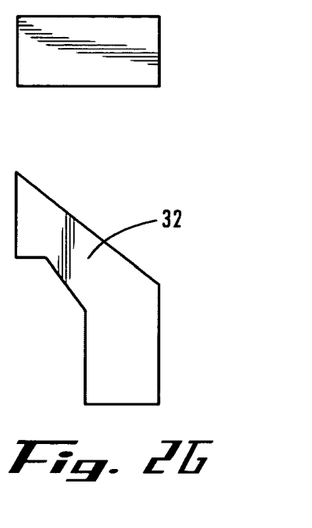
Figure 2H:
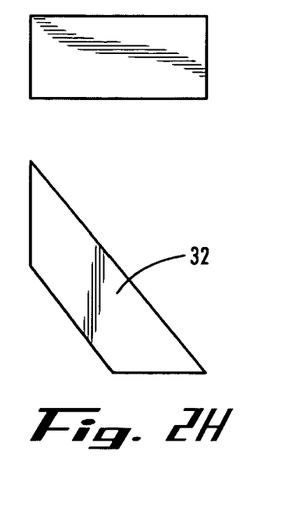
Figure 2I:
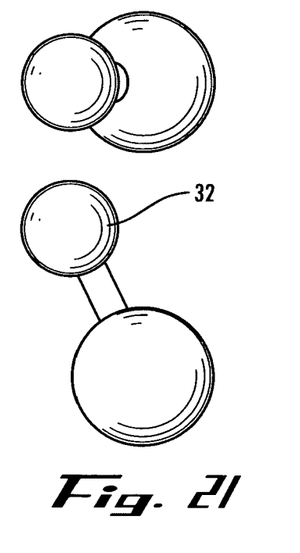
Figure 2J:
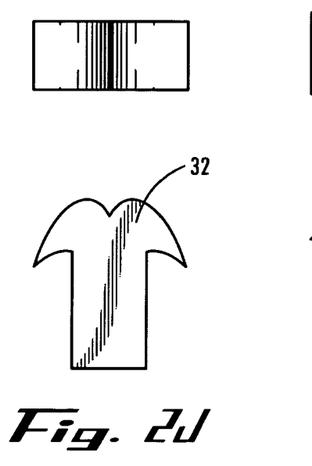
Figure 2K:
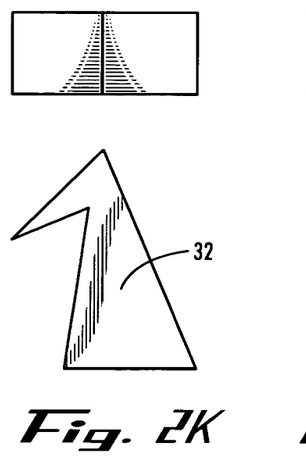
Figure 2L:
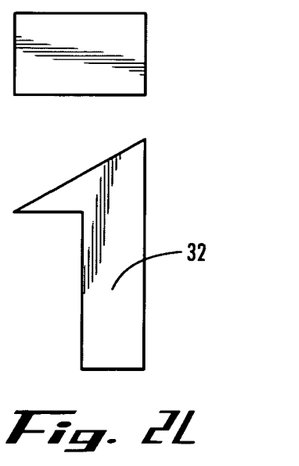

The posts 32 can take one of a number of different shapes and designs. FIGS. 2A-2L depict several example embodiments of the posts. FIG. 2A depicts a post or stub 32, which has a diameter that is a considerable fraction of the height. FIG. 2B depicts a post that has a diameter that is significantly less than its height. The posts 32 can be curved as seen in FIG. 2C or angled as seen in FIG. 2D. The top face of the posts can be circular (FIG. 2A), rectangular (FIG. 2B), elliptical (FIG. 2C) or triangular (FIG. 2D). In other embodiments, the top of the posts 32 can be beveled as shown in FIGS. 2E-2H. In still other embodiments, the posts 32 can be in the form of two connected spheres as seen in FIG. 2I. In some preferred embodiments, the posts 32 are hook shaped, similar to commercial hook and loop fasteners, as depicted in FIGS. 2J-2L. As seen in FIG. 2J, the post 32 may have "hooks" on two or more sides. Regardless of the shape, the posts 32 should be of a size that permits the mesh screen 40 to slip over them. However, the mesh screen 40 may have to be stretched to fit over the posts 32 as the posts could be larger than the screen openings.

Figure 3:
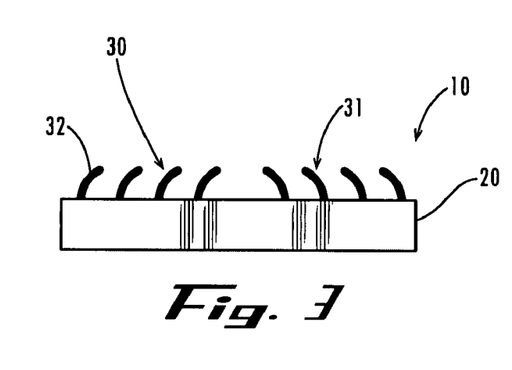
FIG. 3 is a side elevation view of the mounting strip of FIG. 1.
Figure 4:
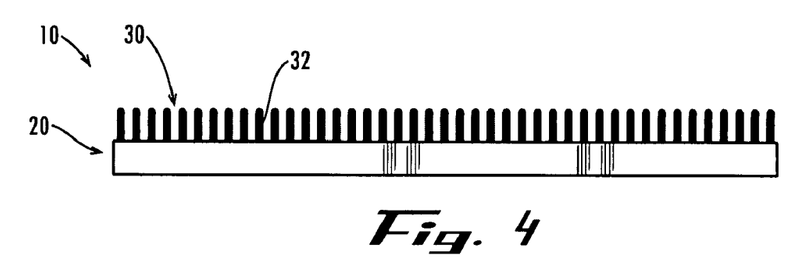
FIG. 4 is a front elevation view of the mounting strip of FIG. 1.
Figure 5:
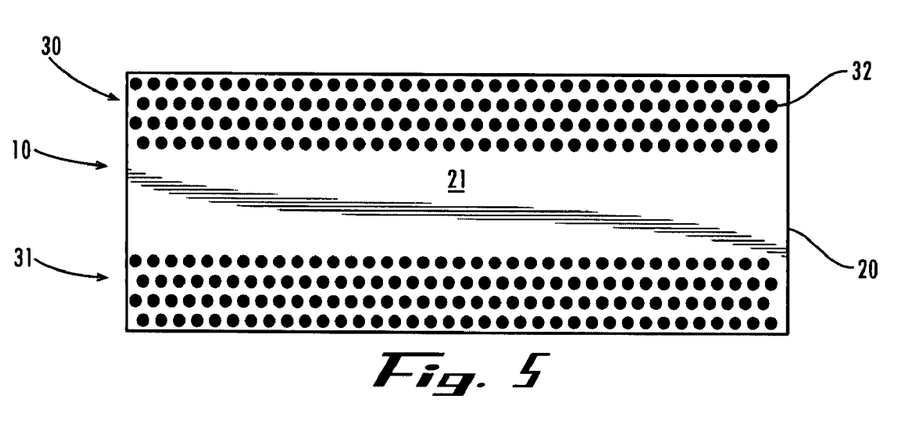
FIG. 5 is a schematic plan view of the mounting strip of FIG. 1.
Figure 6:
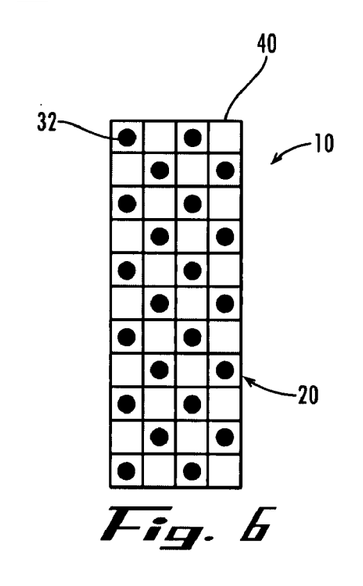
FIG. 6 is a plan view of a mounting strip according to another example embodiment of the invention.

Optionally, the posts 32 are angled at an acute angle with respect to the base 20 of the mounting strip 10 as shown in FIG. 3. Being angled in such a fashion helps to hold the mesh screen securely in place. Additionally, as seen in FIG. 3, it is preferred that the parallel rows of posts 32 are angled toward each other to better secure the mesh screen and prevent movement of the mesh screen in multiple directions. It is preferable that the posts 32 are formed along substantially the entire length of the base 20 as depicted in FIGS. 4-5 while being staggered in a checkerboard fashion as seen in FIG. 6.

Figure 7:
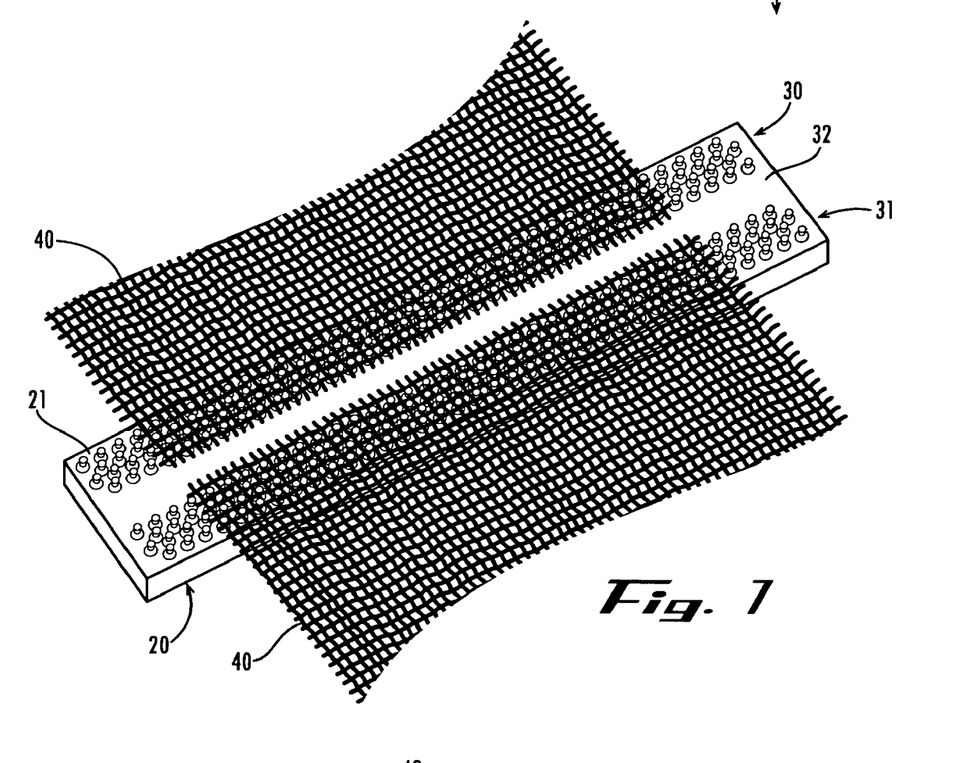
Figure 8:
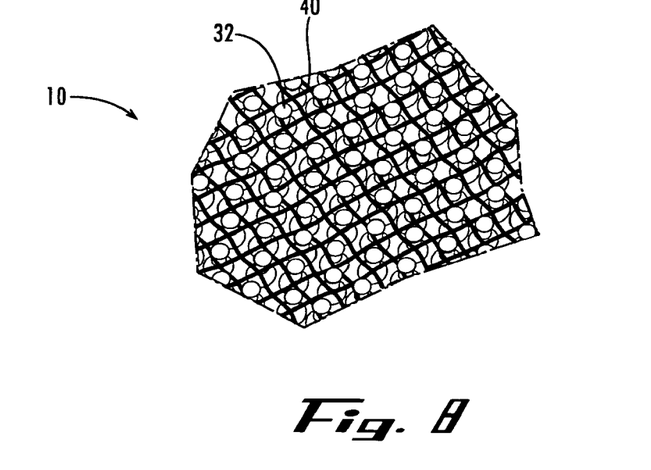
FIG. 8 is a detailed perspective view of the mounting strip of FIG. 7.

The present invention is very easy to use. As depicted in FIG. 7, after the mounting strip 10 has been secured to a working surface (as by fasteners or adhesives), a user may then stretch one conventional mesh screen 40 over one array 30 of the posts 32 and an adjacent conventional mesh screen 40 over the other array 31. With the screen pulled tight, the screen is pulled down over the posts of the mounting strip, to secure the screen in place. In example forms, the mesh screen is securely held in place by the individual posts 32 as seen in FIG. 8. In alternate embodiments, a user can apply adhesive to the screen over areas of intersection with the posts to provide for additional strength. Additionally, the adhesive can be applied to woven mesh (e.g., metal) screen to bind the screen together, allowing the posts to better secure the screen. Similarly, various welding techniques can be applied to woven metallic mesh screen to pre-fuse the metallic strands before fitting the screen over the posts.

Figure 9:
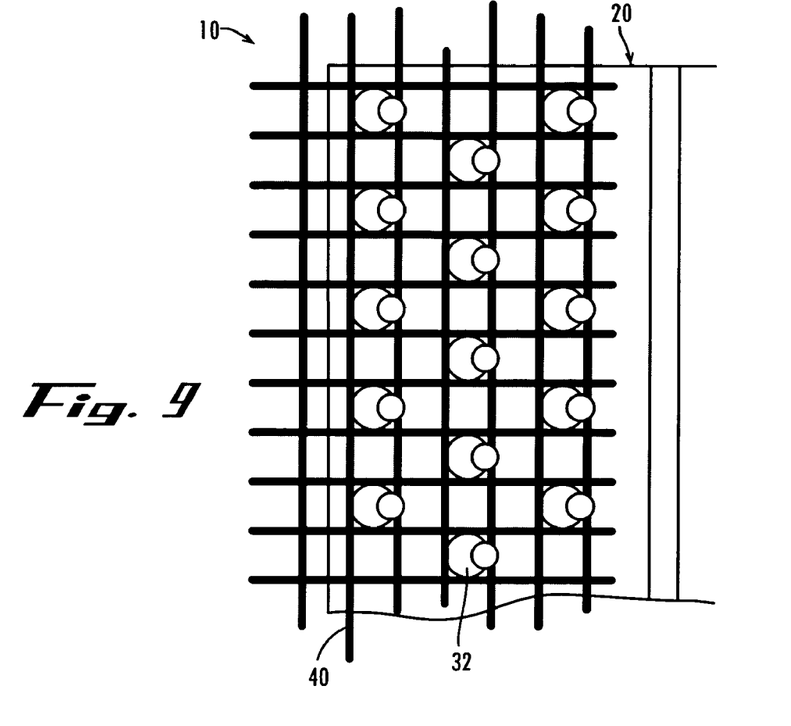
FIG. 9 is a plan view of a mounting strip according to another form of the inventions, and shows the relative alignment between a mesh screen and the mounting strip.

Optionally, the rows of posts can be offset from one other to maximize hold on the mesh screen while minimizing the chance of tearing the screen, as depicted in FIG. 9.

Figure 10:
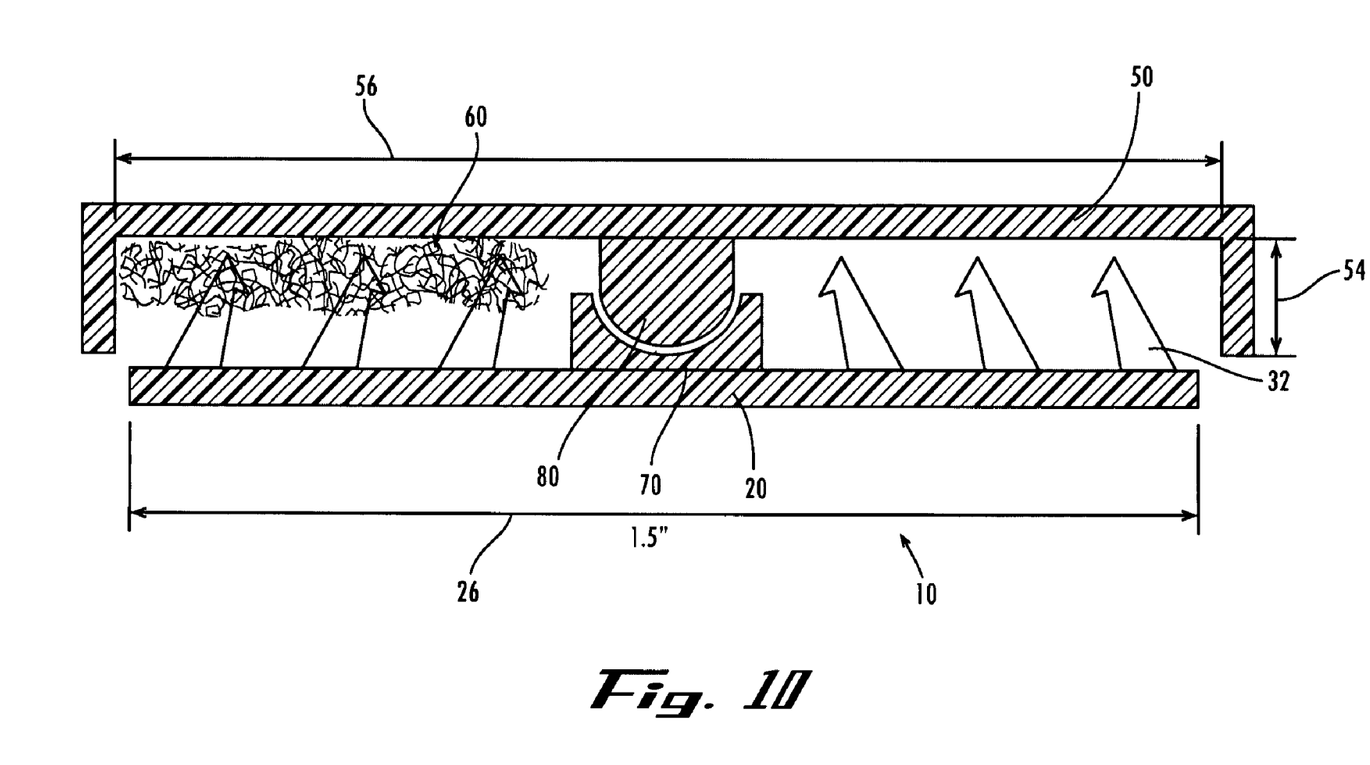
FIG. 10 is a sectional end view of a mounting strip according to another form of the invention and shown mated with a trim cap.

After the mesh screen has been stretched over the mounting strip, preferably a trim cover 50 is then placed on top of the mounting strip 10, as depicted in FIG. 10. The trim cover 50 can be used to help further secure the mesh screen in place and can serve as a decorative cover. Preferably, the trim cover 50 is rectangular in shape, having a height 54 and width 56. In preferred embodiments, the trim cover width 56 is larger than the base width 26 so that the trim cover 50 completely covers the base 20. The trim cover 50 can be placed over the entire length of the mounting strip 10.

In preferred embodiments, the trim cover 50 can be equipped with loop material 60, as seen in FIG. 10. The loop material can be used to secure the trim cover to the (protruding) posts 32 using a hook and loop approach. Alternatively, a mechanical snap lock can be designed into the base and trim cover to secure the cover in place. Optionally, various types of adhesives can be used to secure the trim cover 50 to the mounting strip 10. Additionally, in a preferred form, the mounting strip 10 and the trim cover 50 can each be provided with an alignment element (70 and 80 respectfully) that may be mated together to aid the user in properly fitting the trim cover 50 over the mounting strip 10. The mounting strip alignment element 70 can be U-shaped or rectangular and can provide a channel for the trim cover alignment element 80 to mount into, allowing a user to quickly align and secure the two.

Figure 11:
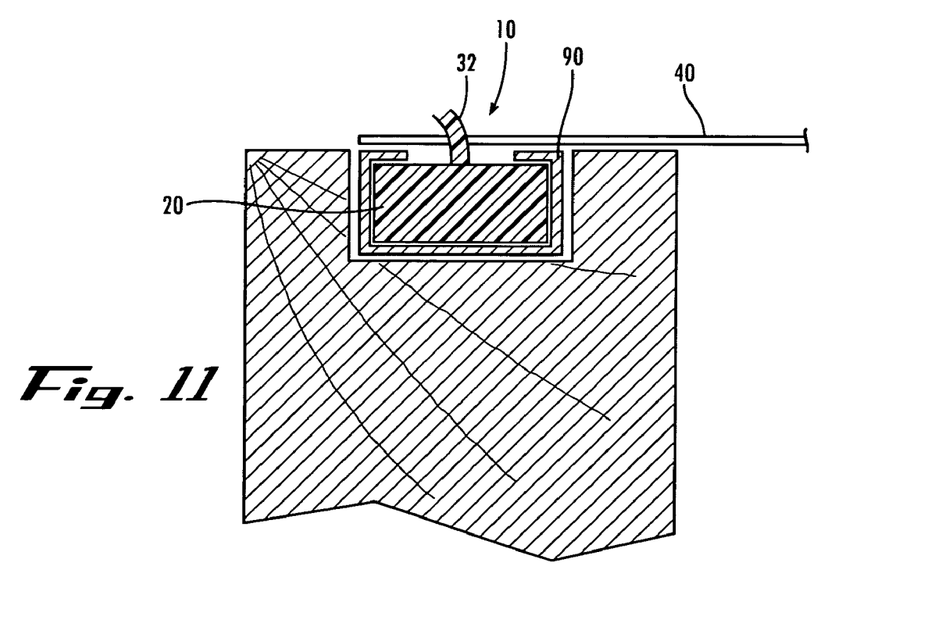
FIG. 11 is a sectional view of a mounting strip according to another form of the invention shown integrated with a structure.

Optionally, in alternative embodiments the mounting strip 10 can be integrated into standard windows, door frames and the like 90 as seen in FIG. 11. In this fashion, it is preferred that the trim cover 50 is of sufficient width and height to cover the underlying door or window frame.

While the invention has been described with reference to preferred and example embodiments, it will be understood by those skilled in the art that a variety of modifications, additions and deletions are within the scope of the invention, as defined by the following claims.

I claim:

1. A kit for mounting open mesh screen to a structure, the kit comprising:
    first and second sections of mesh screen;
    an elongate base; and
    first and second elongate arrays of posts extending from the elongate base, each elongate array having a plurality of rows of posts, each post being operable to engage corresponding openings in the sections of mesh screen to secure the screen sections to the elongate base;
    wherein substantially all of the posts of the first array point in a single first direction generally towards the posts of the second array and substantially all of the posts of the second array point in a single second direction generally towards the first array of posts, wherein the posts of the first array engage the corresponding openings in the first section of mesh screen, and wherein the posts of the second array engage the corresponding openings in the second section of mesh screen.

2. A mounting strip as claimed in claim 1 wherein the posts are angled at an acute angle with respect to the base to help hold the screen in place.

3. A mounting strip as claimed in claim 1 wherein the base is adapted to secure the first and second sections of mesh screen thereto without the use of a resilient spline.

4. A mounting strip as claimed in claim 1 wherein the posts comprise hooks.

5. A mounting strip as claimed in claim 1 further comprising a protective cover for engaging and concealing the base.

6. A mounting strip as claimed in claim 1 further comprising a protective cover with openings corresponding to the location and spacing of the posts.

7. A mounting strip as claimed in claim 1 wherein the elongate base and the posts are plastic.

8. A mounting strip as claimed in claim 5 wherein the elongated base has an alignment element and the protective cover has a corresponding alignment element for engaging the alignment element of the base.

9. A mounting strip as claimed in claim 1 wherein the base has openings formed therein for receiving fasteners therethrough for securing the base to the structure.

10. A mounting strip as claimed in claim 1 wherein the base is operable to receive adhesive for securing the base to the structure.

* * * * *